United States Patent [19]
Dudley et al.

[11] Patent Number: 6,156,213
[45] Date of Patent: Dec. 5, 2000

[54] EMBEDDED SPIN-CLEAN CARTRIDGE-TYPE WATER FILTERS

[76] Inventors: David E. Dudley, 2673 Million Ct., San Jose, Calif. 95148; Joseph D. Robertson, 5164 Selma Ave., Fremont, Calif. 94536

[21] Appl. No.: 09/447,198

[22] Filed: Nov. 22, 1999

Related U.S. Application Data

[63] Continuation-in-part of application No. 09/038,178, Mar. 2, 1998, Pat. No. 5,989,419.

[51] Int. Cl.[7] .................................. E04H 3/16; B08B 9/00
[52] U.S. Cl. .......................... 210/791; 210/136; 210/169; 210/391; 210/411; 134/22.12; 134/33; 134/138; 134/153; 4/496
[58] Field of Search ...................................... 210/107, 136, 210/169, 232, 391, 409, 416.2, 411, 791, 798; 134/32, 33, 137, 138, 144, 151, 152, 22.12, 91, 153; 4/496

[56] References Cited

U.S. PATENT DOCUMENTS

| | | |
|---|---|---|
| 1,034,938 | 8/1912 | Volckening . |
| 2,223,104 | 11/1940 | Hansen . |
| 2,475,702 | 7/1949 | Funke . |
| 2,493,291 | 1/1950 | Dudley . |
| 2,608,567 | 9/1952 | Herbert . |
| 3,608,567 | 9/1971 | Neill, Jr. . |
| 3,622,044 | 11/1971 | Meyer . |
| 4,130,124 | 12/1978 | Sherwin . |
| 4,612,947 | 9/1986 | Duncan . |
| 4,668,384 | 5/1987 | Holman . |
| 4,923,601 | 5/1990 | Drori . |
| 4,941,971 | 7/1990 | Albright . |
| 4,952,325 | 8/1990 | Clifford . |
| 5,203,990 | 4/1993 | Garguilo . |
| 5,277,828 | 1/1994 | Fleming . |
| 5,330,065 | 7/1994 | Bradley . |
| 5,384,045 | 1/1995 | Chmielewski et al. . |
| 5,423,977 | 6/1995 | Aoki et al. . |
| 5,989,419 | 11/1999 | Dudley . |

*Primary Examiner*—David A. Simmons
*Assistant Examiner*—Fred Prince
*Attorney, Agent, or Firm*—Thomas E. Schatzel; Law Offices of Thomas E. Schatzel

[57] ABSTRACT

A water filter includes a cartridge filter element mounted on a coaxial bearing so it can be spun. During normal operation, a pressure tank enclosure allows the outside of the cartridge filter element to be submerged. Filtered water is then collected by a filtered-water return inside the cartridge filter element. An air vent disposed in the pressure tank housing allows water to drain away before starting a cleaning cycle, and to bleed off trapped air before returning to normal operation. During cleaning, a flow of clean water is applied to the filtered-water drain. A wash drain in the bottom of the pressure tank enclosure allows used cleaning water to flow out. The reverse water flow through the filtered-water drain forces closed a flapper valve. This, in turn, causes a water spray jet manifold to fill under pressure and cleaning water sprays out from slightly offset nozzles directed at the cartridge filter element. The coaxial bearing allows the cartridge filter element to spin under hydraulic pressure from the nozzle jet spray. A combination of cleaning water spray and centrifugal force thus cleans filter cake and debris from the cartridge filter element in situ.

11 Claims, 3 Drawing Sheets

EMBEDDED SPIN-CLEAN CARTRIDGE-TYPE WATER FILTERS

RELATED APPLICATIONS

This Application is a continuation-in-part of U.S. patent application Ser. No. 09/038,178, filed Mar. 2, 1998, U.S. Pat. No. 5,989,419 and titled, SPINNER FOR CLEANING CARTRIDGE-TYPE WATER FILTERS.

BACKGROUND OF THE INVENTION

1. Field of the Invention

The invention relates generally to cartridge-type water filters and more specifically to centrifugal cleaning such cartridge filter elements by spinning them on an axle with a water jet.

2. Description of the Prior Art

The typical swimming pool recirculation pump is a centrifugal pump which moves the water by centrifugal force. Water is drawn into the eye of the impeller and then thrown from the outer perimeter of the whirling impeller into the chamber enclosing the impeller and then forced into the piping system. If the water has been filtered prior to reaching the pump, at the suction side of the pump, it is discharged from the pump directly back to the pool. The filter system may be either a vacuum or gravity system. If the water has not been filtered, it is discharged from the pump to a filter station and then on to the pool. This is a so-called pressure system since the water is delivered to the filters under pressure.

Filtration is the physical process of removing dirt particles and solids to prevent impeding the disinfecting process and to promote clarity. Filtration, capable of removing some bacteria, is not a disinfecting process. Disinfecting is the chemical process of killing disease-causing bacteria and other types of microorganisms by maintaining a uniformly dispersed residual of some chemical, usually chlorine, in pool waters. The removal of bacteria by filtration is not considered particularly beneficial. The primary purpose of filtration is to remove all foreign particles which would otherwise increase the disinfectant demand of the water, thus lowering chlorine residuals and weakening the killing power of the chemicals that have been added to sterilize the water. Many alternatives are open to designers and builders to accomplish particle removal through filtration.

As the soil removal process takes place in the filter, the dirt accumulation increases resistance to flow and eventually reduces the flow below the specified amount. At that point the filter must be cleaned. Unicel (Burbank, Calif.) recommends cleaning the filter when the pump output pressure rises 8–10 PSI above the initial or new cartridge starting pressure. Conversely, when the filter is cleaned and returned to service, resistance to flow is at its minimum and flow is at its maximum. Thus, it can be seen that the swimming pool pump output varies over the filter life of the cartridge.

There are five basic filter types traditionally used, e.g., pressure sand, pressure diatomaceous earth, vacuum diatomaceous earth, gravity sand, and cartridge.

Cartridge filter manufacturers typically recommend cleaning the cartridge by first removing it from the filter housing, and rinsing it with a garden hose to remove loose debris. For example, the Modular D.E. Filter marketed by STA-RITE Pool/Spa Group (Waterford, Wis.) must have the tank that contains it opened so the filter can be rinsed. The use of commercial cartridge cleaners are also suggested in other cases, e.g., Guardex Filter Cleaner. The typical filter cartridge is soaked in a separate solution of one part Muriatic acid to twenty parts water until the bubbling stops to remove calcium or mineral buildup. The element is thoroughly rinsed before putting it back in the filter housing. All oils and cleaning solution must be removed from the cartridge before soaking it in the acid solution, otherwise the acid reactions with the residue will permanently clog the filter material.

A typical cartridge filter takes about twenty minutes to clean with a garden hose because each of the longitudinal pleat folds must be combed with water. The force of the water is also pushing the filter cake deeper into the filter medium since the dirt buildup typically occurs on the outside diameter.

Taking cartridge filters out and cleaning them periodically is a chore many pool-owners skip. So to make such chore easier, it has become popular to install as many as four large cartridge filters. The over-capacity is so great, that the filters need only be taken out and cleaned once a season. But this has not really solved the problem because the filter costs are quadrupled and experience is showing these filters too are not being cleaned every season. A cartridge filter that sits dirty too long becomes impacted and cannot come clean, and so a new one must be purchased.

Most filter cartridges are supported inside with a perforated tube. Such tube prevents spin-cleaning from the inside with a water jet because the perforations are too small and few. So these can only be spin-cleaned by directing cleaning-water jets from outside inward toward the filter.

In normal operation, most filter cartridges receive the dirty water to-be-filtered on their submerged outside surfaces. The filtered water is collected inside the volume of the filter cartridge and drains out to the pool. So cleaning involves spinning the cartridge to generate centrifugal force to fling off filter cake and debris, and directing a water jet from inside or outside.

SUMMARY OF THE PRESENT INVENTION

It is therefore an object of the present invention to provide a device to assist a pool owner or caretaker in the easy and effective cleaning of cartridge filters.

It is another object of the present invention to provide an automatic filter-cartridge cleaning mechanism that can be initiated on a periodic schedule.

Briefly, a water filter embodiment of the present invention includes a cartridge filter element mounted on a coaxial bearing so it can be spun. During normal operation, a pressure tank enclosure allows the outside of the cartridge filter element to be submerged. Filtered water is then collected by a filtered-water drain inside the cartridge filter element. During cleaning, a flow of clean water is applied to the filtered-water drain. Pressure from the pump forces cleaning water out through the wash drain. The air vent is closed during the cleaning cycle. The reverse water flow through the filtered-water drain automatically forces closed a flapper valve. This, in turn, causes a water spray jet manifold to fill under pressure and cleaning water sprays out from slightly offset nozzles directed at the cartridge filter element. The coaxial bearing allows the cartridge filter element to spin under hydraulic pressure from the nozzle jet spray. A combination of cleaning water spray and centrifugal force thus cleans filter cake and debris from the cartridge filter element in situ.

An advantage of the present invention is that an apparatus for cleaning cartridge filters is provided that can clean automatically and can be initiated by a timer or by a switch which is activated when filter back pressure reaches a preset limit.

A further advantage of the present invention is that an apparatus for cleaning cartridge filters is provided that does not need the filter to be removed from its housing.

Another advantage of the present invention is that an apparatus for cleaning cartridge filters is provided that will extend the life of the filter.

A still further advantage of the present invention is that an apparatus for cleaning cartridge filters is provided that saves time.

These and many other objects and advantages of the present invention will no doubt become obvious to those of ordinary skill in the art after having read the following detailed description of the preferred embodiments which are illustrated in the drawing figures.

IN THE DRAWINGS

DETAILED DESCRIPTION OF THE PREFERRED EMBODIMENTS

Figure 1:
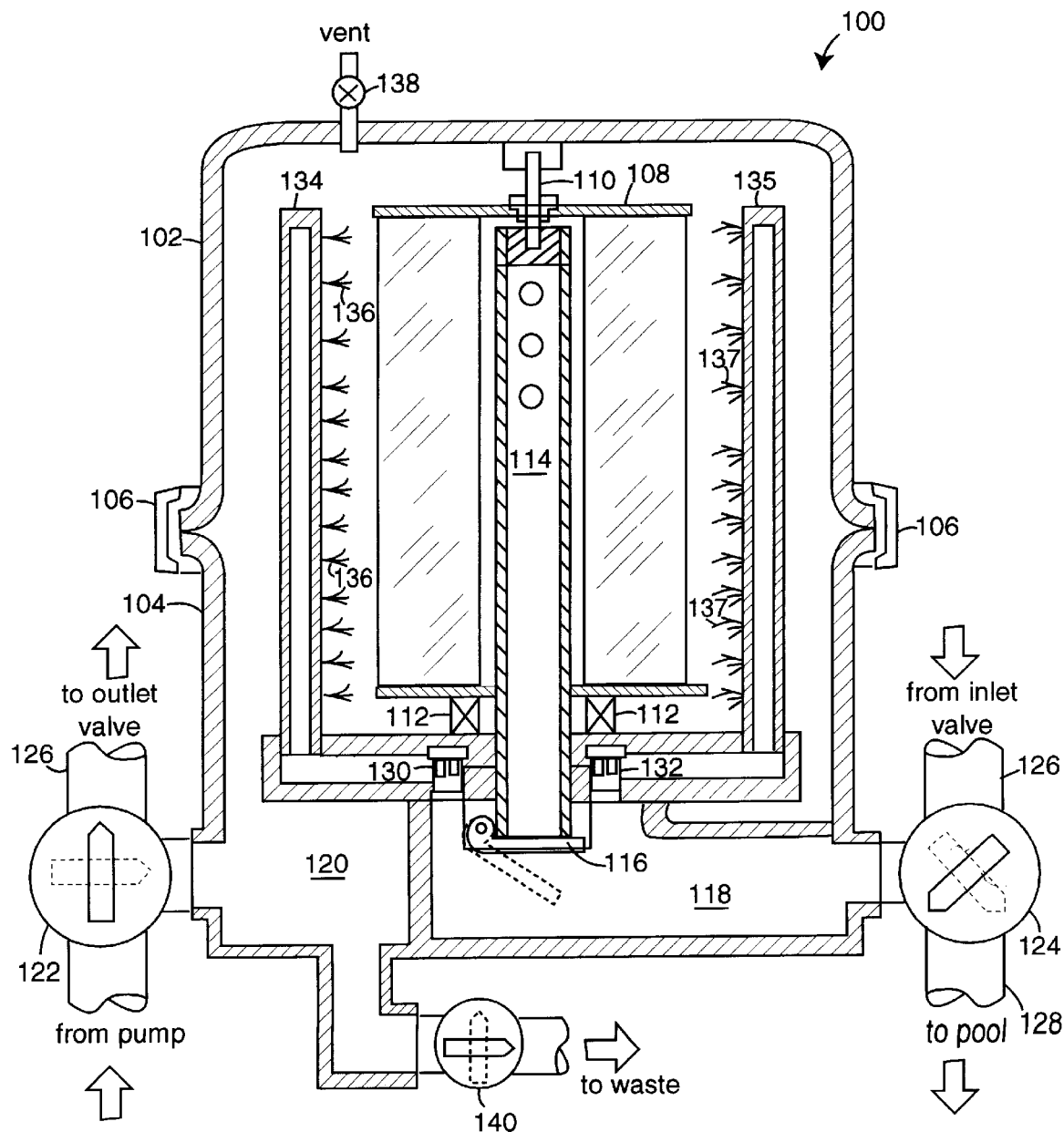
FIG. 1 is a cross-sectional view of a first self-cleaning water filter embodiment of the present invention which directs cleaning water from manifolds outside the filter element inward.

FIG. 1 illustrates a self-cleaning water filter embodiment of the present invention, and is referred to herein by the general reference numeral 100. An upper pressure tank housing 102 and a lower pressure tank housing 104 are joined and sealed together, e.g., by a full-circumference band clamp 106 or other device. A cartridge filter 108 is in the general shape of a hollow cylinder and includes many radial pleats of filter material. A top end of such is capped closed and is suspended by a spindle 110. A bottom end of the cartridge filter 108 is annularly supported and free to rotate on a sealed coaxial bearing 112. An inner tube 114 collects water inside the cartridge filter 108 and allows it to drain out through a one-way flapper valve 116. The solid outline of the flapper valve shows it in its cleaning-mode position (closed), and the dashed outline shows it in its normal operating position (open). An outlet chamber 118 receives any flow that passes through the flapper valve 116.

In general, the cleaning cycle begins by shutting off the water pump. The return-to-pool valve is closed. The drain valve and vent are fully opened to allow the tank to drain. The vent is closed. The normal dirty-water inlet is closed, and the valve is turned so that water from the pool pump is directed through the spray manifold to spin the cartridge. Such pressurizes the tank and forces waste water out the drain. After the spin cleaning is complete, the drain valve is closed, and the return-to-pool valve is opened. The vent is opened to allow the air to bleed out until the tank fills. The air vent is then closed and the system is returned to normal operation.

An inlet chamber 120 receives a flow of pool water from a pump during normal operation through an inlet valve 122. During cleaning, the inlet valve diverts such pressurized pool water to an outlet valve 124 through a bypass pipe 126. The outlet chamber 118 is pressurized by such flow during cleaning by turning the outlet valve to connect bypass pipe 126 and shut off a pool return 128. Such water pressure in chamber 118 will cause the flapper valve 116 to automatically snap closed and forces a pair of check valves 130 and 132 open. The check valves allow water under pressure to flow into one or more water manifolds. In FIG. 1, a pair of water manifolds 134 and 135, for example, include water-jet spray nozzles 136 and 137 that are directed off-center at the filter cartridge 108. Such water manifolds 134 and 135 run parallel to the longitudinal length of the cartridge filter 108 for even cleaning.

Prior to the cleaning cycle, an air vent 138 and a waste valve 140 are opened. Any water that would otherwise submerge the cartridge filter 108, and thus prevent it from being able to spin freely, is drained away. The air vent 138 is then closed. During cleaning the waste valve 140 remains open. Pressure from the pump forces cleaning water out the drain preventing water from accumulating during the cleaning cycle. The water-jet spray nozzles 136 and 137 provide a hydraulic force that will cause the cartridge filter 108 to spin on its coaxial bearing 112 and spindle 110. A combination of cleaning water spray and centrifugal force thus cleans filter cake and debris from the cartridge filter element in situ.

Figure 2:
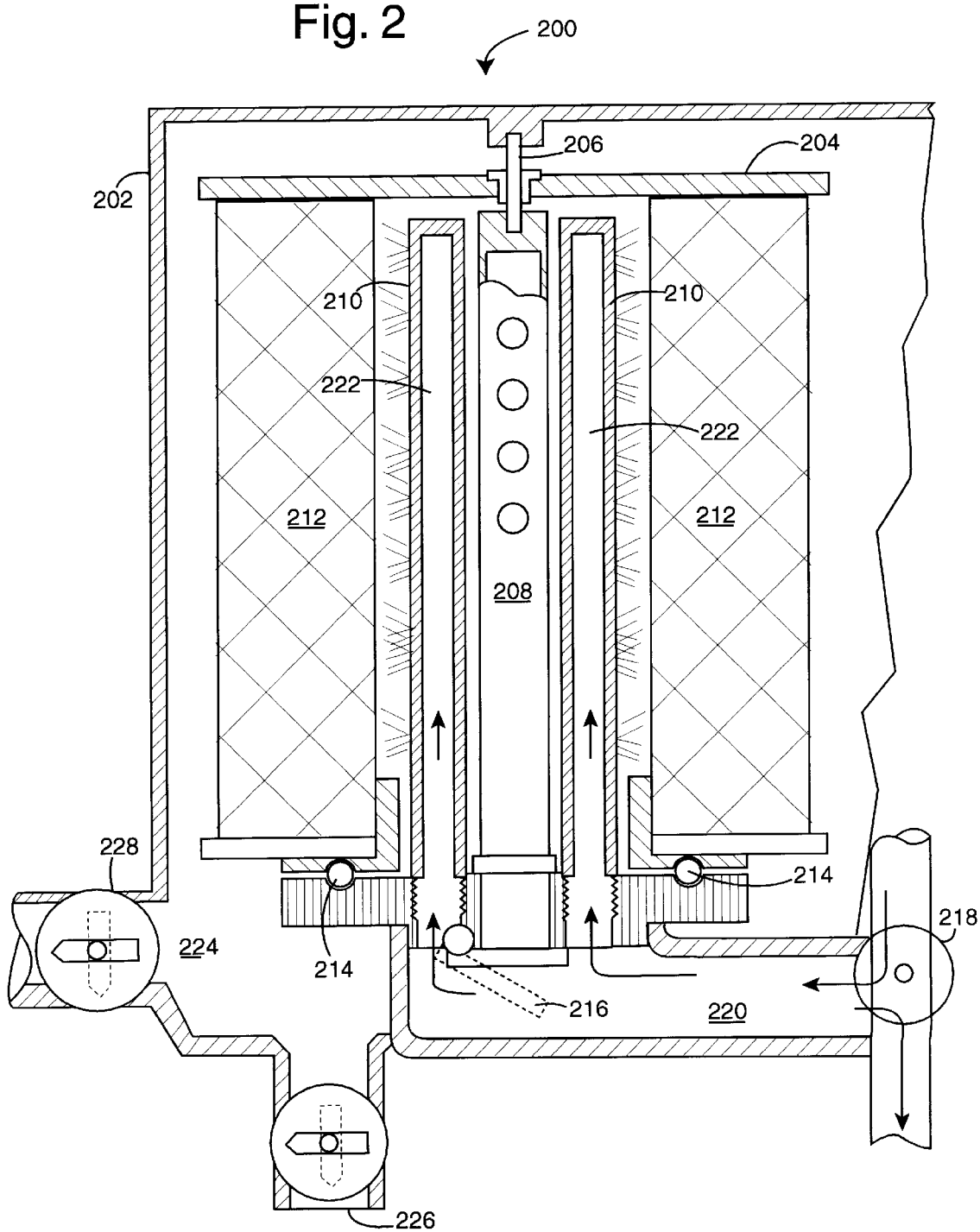
FIG. 2 is a cross-sectional view of a second self-cleaning water filter embodiment of the present invention which directs cleaning water from chambered passages inside a filter support from within the filter element outward.

FIG. 2 represents a second-type of water filter, in an alternative embodiment of the present invention, and is referred to herein by the general reference numeral 200. The water filter 200 includes a pressurizable housing 202 in which is disposed a coreless pleated cartridge filter 204, e.g. those manufactured by Jacuzzi Brothers. A spindle 206 attached at the top center allows the cartridge filter 204 to rotate on its longitudinal axis. A central water collection tube 208 conducts filtered water down and out. A chambered support cylinder 210 provides mechanical support to a radially pleated filter material 212 during normal operation. During cleaning, an internal flow of water is jetted through nozzles and holes outward to the filter material 212. A ball bearing 214 supports the weight of the cartridge filter 204 and allows it to rotate during cleaning. A flapper valve 216 is normally open. But when a valve 218 is adjusted to allow pump water into a chamber 220, the flapper valve 216 closes automatically. This action forces cleaning water up into a set of internal passages 222 within the chambered support cylinder 210. Such water squirts out through nozzles or simple holes at an angle that will hydraulically spin the cartridge filter 204.

The cleaning water is motivated through the radially pleated filter material 212 by centrifugal force and collects in a chamber 224. A waste water outlet 226 allows filter cake and other debris to flow out.

During normal operation, pump water enters at an inlet 228 and the waste water outlet 226 is closed. Valve 218 is adjusted to allow water that flows into the chamber 220 to return, e.g., to a pool.

Figure 3:
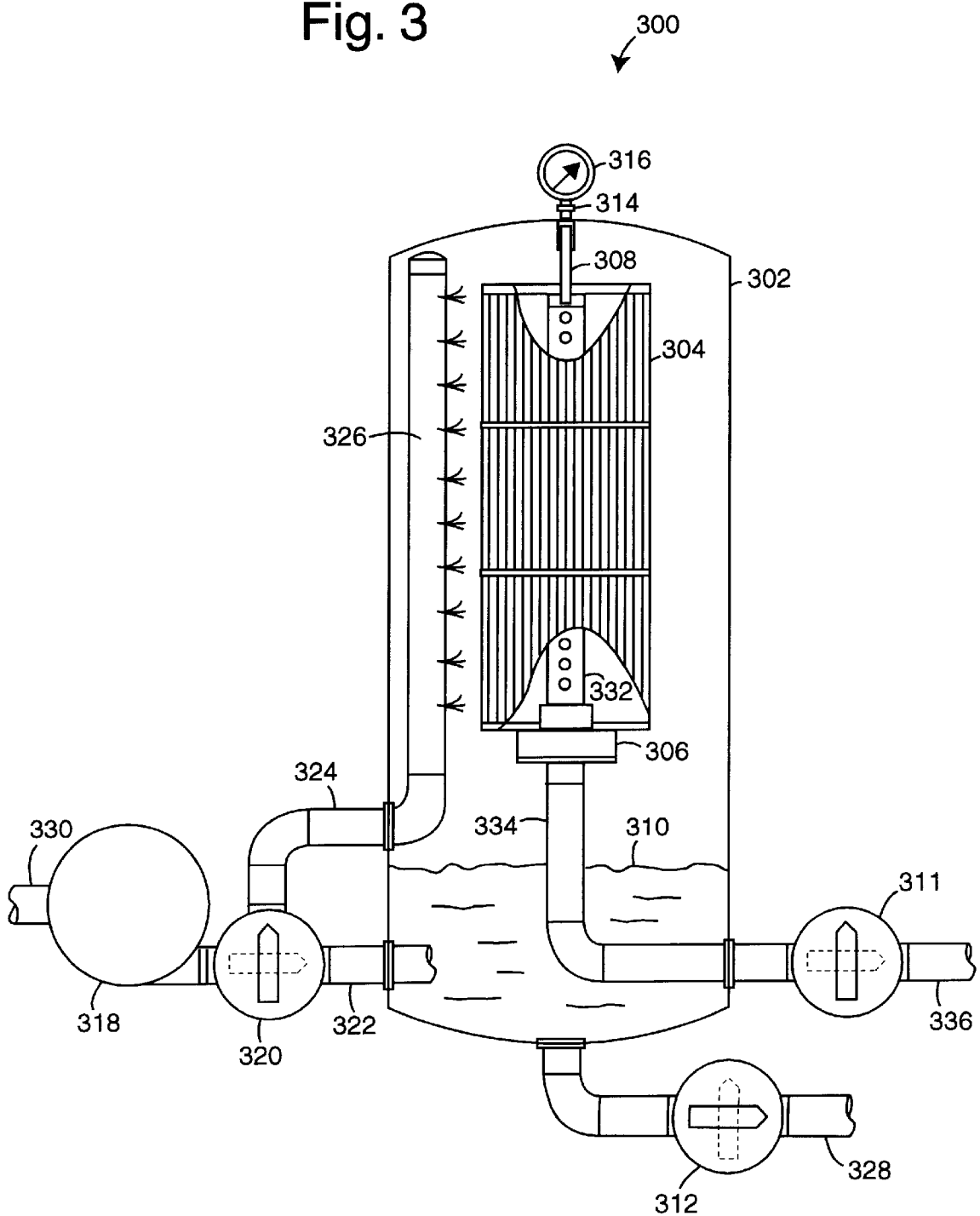
FIG. 3 is a cross-sectional view of a third self-cleaning water filter embodiment of the present invention which directs cleaning water from a spray manifold.

FIG. 3 represents a water filter system embodiment of the present invention, and is referred to herein by the general reference numeral 300. The system 300 includes a filter housing 302 that envelopes a cartridge filter 304 which gets clogged and caked with debris during normal operation. The system 300 therefore includes a ball bearing 306 and a spindle 308 that allow the cartridge filter 304 to be spun for centrifugal cleaning during a cleaning cycle. During normal operation, a water level 310 submerges the cartridge filter 304. During cleaning cycles, the water level 310 is drained away to expose the cartridge filter 304.

Just before a cleaning cycle is begun, a filter return valve 311 is closed. Then, a drain valve 312 and an air vent 314 are opened to drain the water from the housing 302. A pressure gauge 316 allows a user to view the pressure inside the filter housing 302. A dirty cartridge filter 304 that needs cleaning will cause the pressure gauge 316 to read unusually high. After the water is drained the air vent 314 is closed.

During cleaning, a pump 318 supplies a flow of water that is diverted by a valve 320 from an inlet 322 to a pipe 324 connected to a water-jet manifold 326. Cleaning water sprays from the water-jet manifold 326 and causes the cartridge filter 304 to spin. Waste water flows out through the open drain valve 312 through a waste pipe 328.

During normal filtering operation, the drain valve 312 is closed, the diverter valve 320 is adjusted to connect the pump 318 to the inlet 322, and the filter return valve 311 is opened. Water, e.g., from a pool, is drawn in through a suction pipe 330 by the pump 318. The water level 310 rises and submerges the cartridge filter 304. Such water is filtered by passing through a pleated filter material and inside to a collection core 332. Such filtered water is forced out through an outlet pipe 334 through the filter return valve 311 and back to the pool through a filtered-water pipe return 336.

Embodiments of the present invention will naturally find many applications in pool and tub water filtration systems. Such systems recirculate the same water over and over with a dedicated pump. But alternative embodiments of the present invention could be used quite successfully where the incoming water is filtered once and then consumed. For example, a household water filtration system could benefit from the methods and apparatus described herein. To clean the filter, pressurized water from the water utility would be temporarily valved to the filter outlet. An internal flapper valve (like that in FIG. 1) closes and directs the water through the spray manifold to clean the cartridge. The wash water is sent to a waste drain.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A self-cleaning water filter, comprising:
    a cartridge filter element in the general form of a hollow cylinder;
    a bearing providing mechanical support for the cartridge filter element and mounted coaxially with the cartridge filter element such that the cartridge filter element is able to rotate on its longitudinal axis;
    a water manifold with water-jet nozzles proximate to the cartridge filter element and for providing a water spray able to spin the cartridge filter element on the bearing; and
    a one-way valve hydraulically connected to an interior volume of the cartridge filter element for providing an outlet for filtered water;
    wherein, a reverse flow of water through the one-way valve causes it to close and be directed through the water manifold.

2. The self-cleaning water filter of claim 1, further comprising:
    a pressure tank housing that completely encloses the cartridge filter element, bearing, water manifold, and one-way valve.

3. The self-cleaning water filter of claim 2, further comprising:
    a filtered water drain disposed in the pressure tank housing for receiving a flow of filtered water from an interior volume of the cartridge filter element through the one-way valve.

4. The self-cleaning water filter of claim 2, further comprising:
    a wash drain disposed in the pressure tank housing for receiving a flow of wash water from an exterior volume of the cartridge filter element from the water manifold.

5. The self-cleaning water filter of claim 2, further comprising:
    a dirty water inlet disposed in the pressure tank housing for receiving a flow of water to-be-filtered to submerge the cartridge filter element.

6. The self-cleaning water filter of claim 2, further comprising:
    an air vent disposed in the pressure tank housing to allow water to drain away before starting a cleaning cycle, and to bleed off trapped air before returning to normal operation.

7. The self-cleaning water filter of claim 1, wherein:
    the water manifold has more than one branch arms that run parallel with an outside surface of the cartridge filter element.

8. The self-cleaning water filter of claim 1, wherein:
    the water manifold is disposed internal to an inside surface of the cartridge filter element.

9. A method of cleaning water filters in situ, the method comprising the steps of:
    mounting a cartridge filter on a freely rotatable base so that it may be spun;
    directing a water flow from an inlet to outside said cartridge filter through to its inside during a normal mode of operation;
    providing a one-way valve in said rotatable base that allows said water flow to exit through an outlet but not to reverse; and
    manifolding a reverse water flow from said outlet that causes said one-way valve to close and to be directed to a series of jet-spray water nozzles that are positioned to spin said cartridge filter;
    wherein a combination of cleaning water spray and centrifugal force provide for a cleaning of a filter cake and debris from said cartridge filter element in situ.

10. A self-cleaning water filter, comprising:
    a cartridge filter element in the general form of a hollow cylinder;
    a bearing providing mechanical support for the cartridge filter element and mounted coaxially with the cartridge filter element such that the cartridge filter element is able to rotate on its longitudinal axis;
    a water manifold with water-jet nozzles proximate to the cartridge filter element and for providing a water spray able to spin the cartridge filter element on the bearing;
    a one-way valve hydraulically connected to an interior volume of the cartridge filter element for providing an outlet for filtered water, wherein a reverse flow of water through the one-way valve causes it to close and be directed through the water manifold;
    a pressure tank housing that completely encloses the cartridge filter element, bearing, water manifold, and one-way valve;

a filtered water drain disposed in the pressure tank housing for receiving a flow of filtered water from an interior volume of the cartridge filter element through the one-way valve;

a wash drain disposed in the pressure tank housing for receiving a flow of wash water from an exterior volume of the cartridge filter element from the water manifold;

a filter return valve that is opening during normal operation and that is closed during a cleaning cycle;

a dirty water inlet disposed in the pressure tank housing for receiving a flow of water to-be-filtered to submerge the cartridge filter element; and an air vent disposed in the pressure tank housing to allow water to drain away before starting a cleaning cycle, and to bleed off trapped air before returning to normal operation.

11. A self-cleaning water-filter system, comprising:

a filter housing in which is disposed a rotation-free central axle, and having a raw water inlet, a filtered water outlet, and a waste water outlet;

a cartridge filter mounted with the filter housing on said rotation-free central axle and having said raw water inlet and said waste water outlet on an upstream side, and having said filtered water outlet on a downstream side;

a manifold connected to the pressure-water source and disposed within the filter housing and having a plurality of water nozzle jets directed at said upstream side of the cartridge filter that are able to hydraulically rotate the cartridge filter;

a diverter valve connected to receive a pressurized raw water supply and to direct a water flow to the manifold, and providing for a spinning action of the cartridge filter;

a filter-return valve connected to said filtered water outlet;

a drain valve connected to said waste water outlet of the filter housing and providing for a draining of the filter housing when the filter cartridge is spun for cleaning; and a pressure-water source which comprises a water pump and providing for sufficient water pressure and velocity to said water nozzle jets to be able to cause the cartridge filter to spin.

* * * * *